US007865382B2

(12) United States Patent
Menon et al.

(10) Patent No.: US 7,865,382 B2
(45) Date of Patent: Jan. 4, 2011

(54) COMPLIANCE CONTROL FRAMEWORK

(75) Inventors: Ranjit Menon, Mumbai (IN); Ramakrishnan Satyamurthy, Bangalore (IN); Singaravelu Saravanan, Tamilnadu (IN); Sivaram Sivasubramanian, Kamataka (IN); Dhiraj Ramaprasad, Mumbai (IN); Fauzia Zaman Mallik, Chicago, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 1161 days.

(21) Appl. No.: 11/513,409

(22) Filed: Aug. 31, 2006
(Under 37 CFR 1.47)

(65) Prior Publication Data
US 2008/0059276 A1 Mar. 6, 2008

(51) Int. Cl.
*G06F 9/44* (2006.01)
(52) U.S. Cl. ...................... 705/7; 705/8; 705/9; 705/10; 705/11; 718/100
(58) Field of Classification Search ............... 705/7–11; 715/810; 718/100–103
See application file for complete search history.

(56) References Cited

U.S. PATENT DOCUMENTS

| | | | | |
|---|---|---|---|---|
| 6,092,048 | A * | 7/2000 | Nakaoka ........................ | 705/9 |
| 6,101,481 | A * | 8/2000 | Miller ............................ | 705/9 |
| 7,086,057 | B2 * | 8/2006 | Hayashi ....................... | 718/102 |
| 7,127,059 | B2 * | 10/2006 | Galvin .................... | 379/265.03 |
| 7,280,976 | B2 * | 10/2007 | Litwiller et al. ............... | 705/11 |
| 7,403,948 | B2 * | 7/2008 | Ghoneimy et al. ................. | 1/1 |
| 2001/0027463 | A1 * | 10/2001 | Kobayashi ................... | 709/103 |
| 2002/0116620 | A1 * | 8/2002 | Gimbert et al. ............. | 713/185 |
| 2002/0129221 | A1 * | 9/2002 | Borgia et al. .................... | 712/1 |
| 2002/0143595 | A1 * | 10/2002 | Frank et al. ..................... | 705/8 |
| 2002/0165726 | A1 * | 11/2002 | Grundfest ....................... | 705/1 |
| 2002/0184068 | A1 * | 12/2002 | Krishnan et al. ................ | 705/8 |
| 2003/0069983 | A1 * | 4/2003 | Mukund ..................... | 709/229 |

(Continued)

OTHER PUBLICATIONS

W. Emmerich et al. (Managing standards Compliance IEEE Transactions on Software Engineering, 1999, vol. 25, No. 6, pp. 836-851).*

(Continued)

*Primary Examiner*—Romain Jeanty
*Assistant Examiner*—Alan Miller
(74) *Attorney, Agent, or Firm*—Finnegan, Henderson, Farabow, Garrett & Dunner, LLP

(57) ABSTRACT

Compliance Control Framework of the present invention is designed to capture the context and actionables of the agreement at the time of inking of the agreement. Respective stakeholders are mapped in the Compliance Control framework using a tool and weighting capture in the agreement context. Stakeholders and independent parties evaluate the control environment at the point of delivery and update the tool on the compliance. The tool helps the stakeholder to identify options that would be available to comply with agreed requirements. Control framework provides opportunity to redefine or seek addendum or identify cost effective options through various means. The compliance framework monitors and tracks the progress through action taken report and update the tools to provide enterprise wide compliance perspective. The tool aids in traffic light decision points for management to anticipate compliance problem areas and close them through enterprise-wide initiatives. The tool in the Compliance Control framework provides interface for point of view on customer compliance trends based on pre-defined segment.

13 Claims, 9 Drawing Sheets

U.S. PATENT DOCUMENTS

| | | | |
|---|---|---|---|
| 2003/0083891 A1* | 5/2003 | Lang et al. | 705/1 |
| 2003/0101086 A1* | 5/2003 | San Miguel | 705/9 |
| 2003/0187724 A1* | 10/2003 | Litwiller et al. | 705/11 |
| 2003/0217036 A1* | 11/2003 | Haunschild et al. | 707/1 |
| 2004/0017400 A1* | 1/2004 | Ly et al. | 345/810 |
| 2004/0107124 A1* | 6/2004 | Sharpe et al. | 705/7 |
| 2004/0255265 A1* | 12/2004 | Brown et al. | 717/101 |
| 2004/0260583 A1* | 12/2004 | King et al. | 705/7 |
| 2005/0091098 A1* | 4/2005 | Brodersen et al. | 705/8 |
| 2005/0197952 A1* | 9/2005 | Shea et al. | 705/38 |
| 2006/0047561 A1* | 3/2006 | Bolton | 705/10 |
| 2006/0129441 A1* | 6/2006 | Yankovich et al. | 705/8 |
| 2006/0136922 A1* | 6/2006 | Zimberg et al. | 718/100 |
| 2007/0094284 A1* | 4/2007 | Bradford et al. | 707/101 |

OTHER PUBLICATIONS

Mark Flattery, Workflow Systems, Tessella Support Services PLC, Issue V1.R0.M0. Apr. 2005.*

L.A. Balbonie, Realization of a Vision—A Software System for Materials Management and Compliance, IEEE 1993, pp. 98-100.*

* cited by examiner

Compliance Tool
100

Figure 3

Project Tasks Data Record 200

| Project Identifier 201 | | | | | | | |
|---|---|---|---|---|---|---|---|
| Task Name 220 | Task Type 230 | Task Location 240 | Stakeholder 250 | Deadline 260 | Status 270 | Task Weighting 280 | Task Details 290 |
| Task Name 220' | Task Type 230' | Task Location 240' | Stakeholder 250' | Deadline 260' | Status 270' | Task Weighting 280' | Task Details 290' |
| ... | | | | | | | |
| Task Name 220'' | Task Type 230'' | Task Location 240'' | Stakeholder 250'' | Deadline 260'' | Status 270'' | Task Weighting 280'' | Task Details 290'' |
| Task Name 220''' | Task Type 230''' | Task Location 240''' | Stakeholder 250''' | Deadline 260''' | Status 270''' | Task Weighting 280''' | Task Details 290''' |

210

215

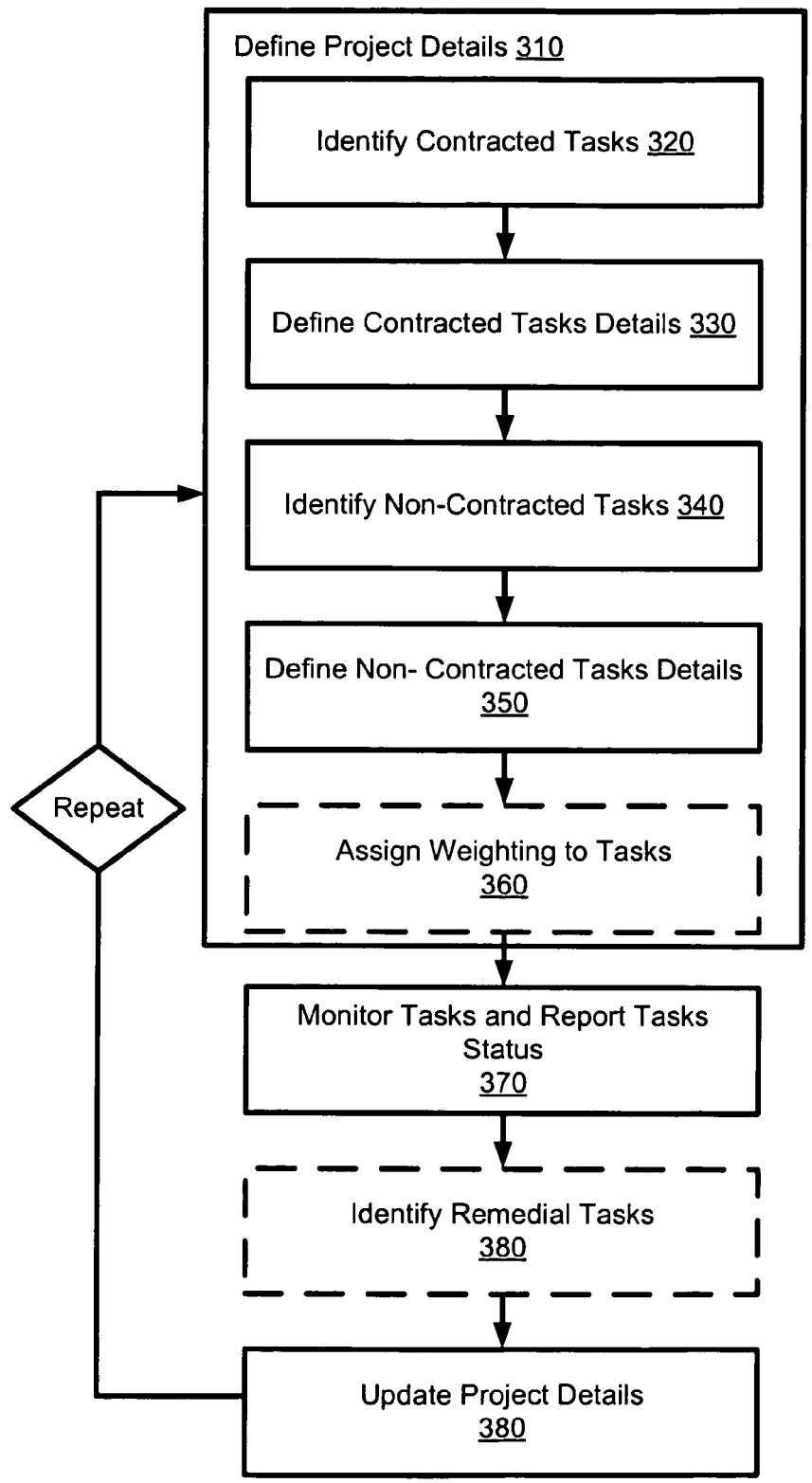

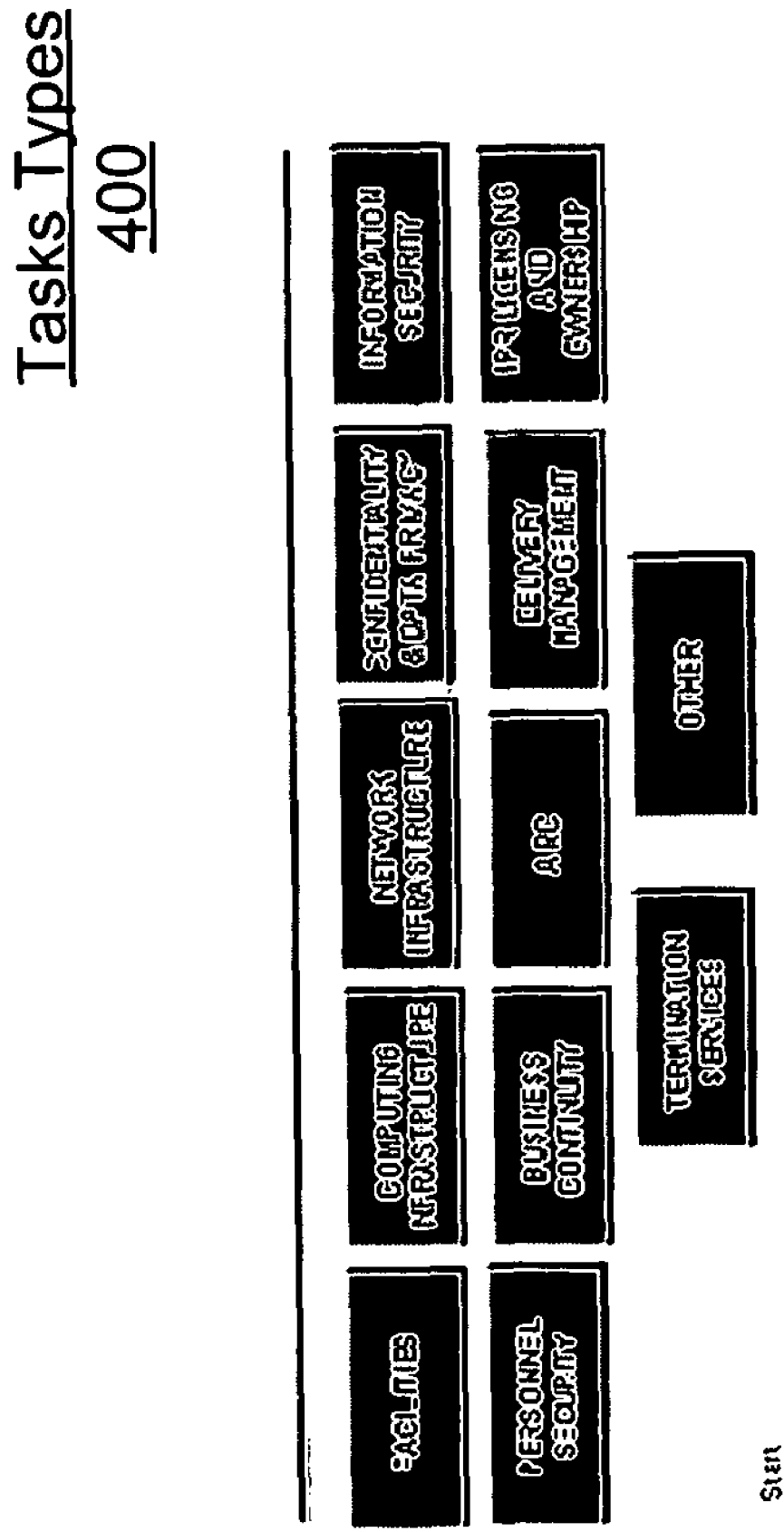

Figure 6 500

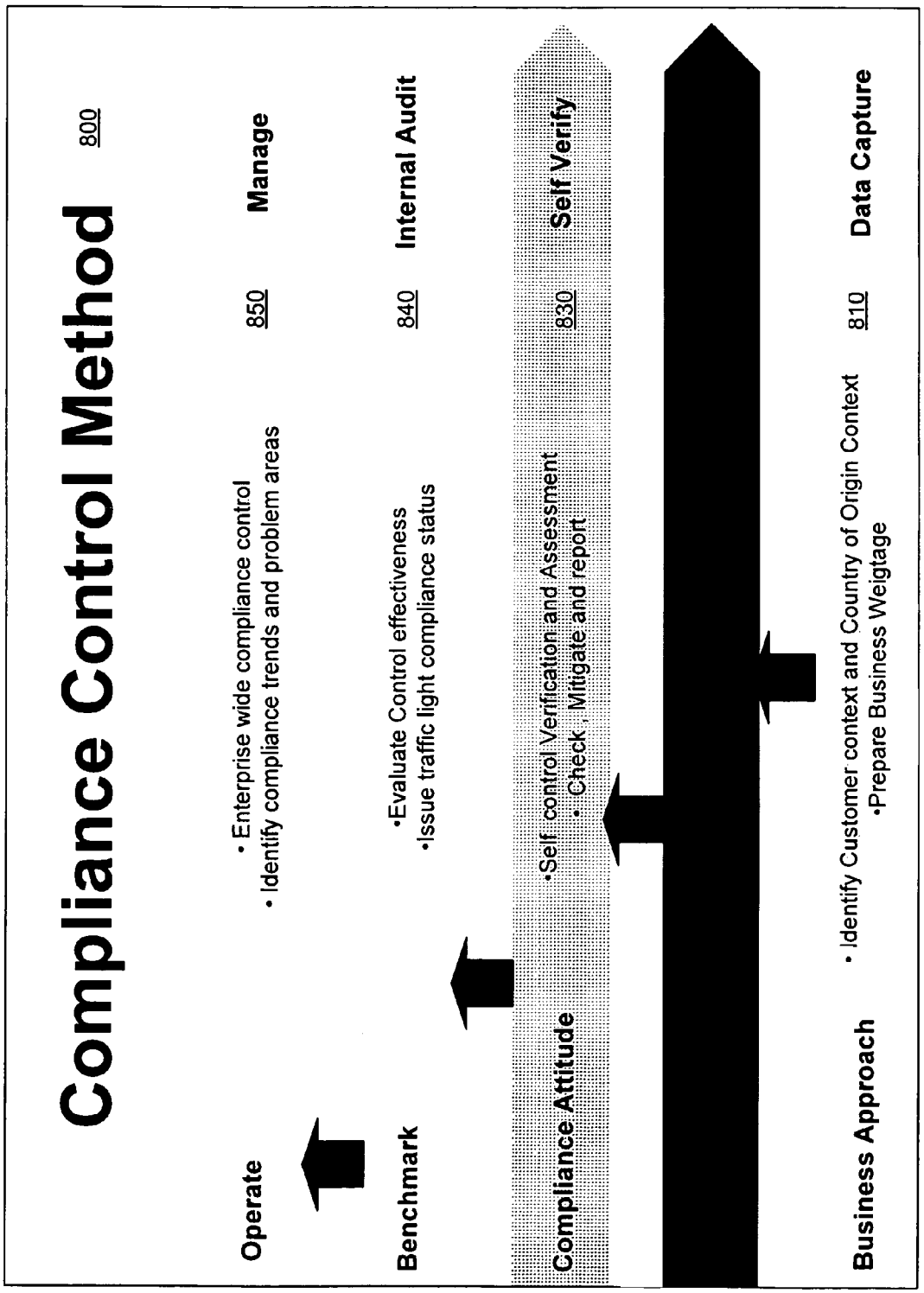

COMPLIANCE CONTROL FRAMEWORK

FIELD OF THE INVENTION

The present invention generally related to an automated system for defining and tracking tasks for completing a complex project. The present invention has particular application to outsourcing or subcontracting aspects of the complex project to a third party, and then tracking compliance with various regulatory and contractual terms by the third party.

BACKGROUND

With the division of duties in a complex project, such as the creation of a new product, the administration of the project becomes increasingly complicated and difficult. Moreover, the division of the task between various locations, potentially located in different places, or even various countries located on different continents. For example, it has become increasingly common to outsource various tasks in a project for various economic reasons, including costs, availability of appropriately skilled and trained labor, availability of natural resources, the availability of needed infrastructure and equipment, etc.

Tracking completion of tasks distributed among various locations is a difficult process since each of the locations may have different record keeping and management styles. Furthermore, existing tracking solutions do not assist an organization in defining tasks, distributing the tasks, monitoring the status of the tasks to identify any lagging tasks, and proposing courses of action to address the lagging tasks. Furthermore, none of the existing solution allows an organization to measure the compliance of the various tasks in a meaningful way, such as the ability to accurately comparing the ability to punctually complete different types of tasks at different locations by different personnel at each of the location. In this way, an organization may determine, for example, that certain tasks should not be assigned to certain locations or certain personnel.

This type of analysis further allows an organization to needed remedial actions to address any problems in completion of tasks, such as to better allocate resources or to better schedule performance of the tasks.

Furthermore, project often entails various tasks that, although necessary, may not be expressly listed in a contract. For example, project may have various overriding legal, regulatory, and other overriding business requirements (e.g., satisfaction of customer expectations from prior contracts). Suppose, for example, a customer contracts to have company create a software application, and that company subcontracts various third parties to complete aspects of the software application. Aside from express desires of the client, the company may need to identify and ensure that various other implied tasks are completed. For example, the software may need to comply with various government regulations and industry standards that do not exist in the location of the third-party. Thus, company will need to identify, instruct and track completion of the various government regulations and industry standards by the third party.

Similarly, other implied duties may exist in a project. For example, a customer may expect certain actions based upon prior transactions. A third party would not know of these implied duties however, since it may never have dealt with Currently, no technology exists to perform the function of identifying and assigning implied tasks, and instead, projects are managed using trained people. However, this leads to an inherent risk that one or more of the government regulations and industry standards are not met, particularly, as government regulations and industry standards vary in different locations and are in constant flux. Conversely, management may respond to this problem by undertaking potentially unnecessary tasks to minimize the risk of failing to compliance with contract terms and government regulations and industry standards but increasing project costs.

Furthermore, it is difficult to track and monitor completion of the implied tasks since, as described above, it is often difficult to even identify the implied tasks.

SUMMARY OF THE INVENTION

Delivery centers create and deliver value for large number of customers based on the agreed terms of customers. The terms involve contractual, legal and regulatory requirements. This innovation captures the requirement along with organizational agreement context and provides a decision point for compliance. The decision point interface is available for every stakeholder committing the delivery and weighted average "traffic light" like dashboard monitors, tracks and provide trigger for compliance.

Compliance Control Framework of the present invention is designed to capture the context and actionables of the agreement at the time of inking of the agreement. Respective stakeholders are mapped in the Compliance Control framework using a tool and weighting capture in the agreement context. Stakeholders and independent parties evaluate the control environment at the point of delivery and update the tool on the compliance. The tool helps the stakeholder to identify options that would be available to comply with agreed requirements. Control framework provides opportunity to redefine or seek addendum or identify cost effective options through various means. The compliance framework monitors and tracks the progress through action taken report and update the tools to provide enterprise wide compliance perspective. The tool aids in traffic light decision points for management to anticipate compliance problem areas and close them through enterprise-wide initiatives. The tool in the Compliance Control framework provides interface for point of view on customer compliance trends based on pre-defined segment.

An Enterprise-wide compliance traffic light like dashboard proactively evaluates enterprise compliance exposure and also provides snapshot of corrective measures needed enterprise wide. In this way, the compliance tool captures the agreed terms of customer as actionable points in the organization and country of Origin context, and evaluates the current effectiveness of compliance at the point of delivery. Likewise, the areas of improvement are identified through control framework and provides unique weightage for prioritization, while helping stakeholders to identify options for compliance. Also, the tool tracks and monitors corrective action for enterprise compliance and provides key interface to analyze and anticipate compliance trends in the customer by pre-defined segments.

Specifically, the compliance control framework is designed to capture the context and actionables of the agreement at the time of inking of the agreement. Respective stakeholders are mapped in the Compliance Control framework using a tool and weighting capture in the agreement context. Stakeholders and independent parties evaluate the control environment at the point of delivery and update the tool on the compliance. The tool helps the stakeholder to identify options that would be available to comply with agreed requirements. Control framework provides opportunity to redefine or seek addendum or identify cost effective options through various means. The compliance framework monitors and tracks the progress through action taken report and update the tools to provide enterprise wide compliance perspective. The tool aids in traffic light decision points for management to anticipate compliance problem areas and close them through enterprise-wide initiatives. The tool in the Compliance Control framework provides interface for point of view on customer compliance trends based on a predefined segment.

BRIEF DESCRIPTION OF THE DRAWINGS

A more complete understanding of the present invention and advantages thereof may be acquired by referring to the following description taken in conjunction with the accompanying drawings in which like reference numbers indicate like features, and wherein:

FIG. 3 is an illustrative project task record used in the compliance control tool of FIG. 2 in accordance with an embodiment of the present invention;

FIGS. 4 and 9 are flow diagrams depicting the steps in a compliance control method in accordance with an embodiment of the present invention;

FIG. 5 depicts exemplary tasks types in accordance with an embodiment of the present invention;

FIG. 6 is an exemplary project task record in accordance with an embodiment of the present invention.

DETAILED DESCRIPTION OF THE PREFERRED EMBODIMENTS

Figure 1:
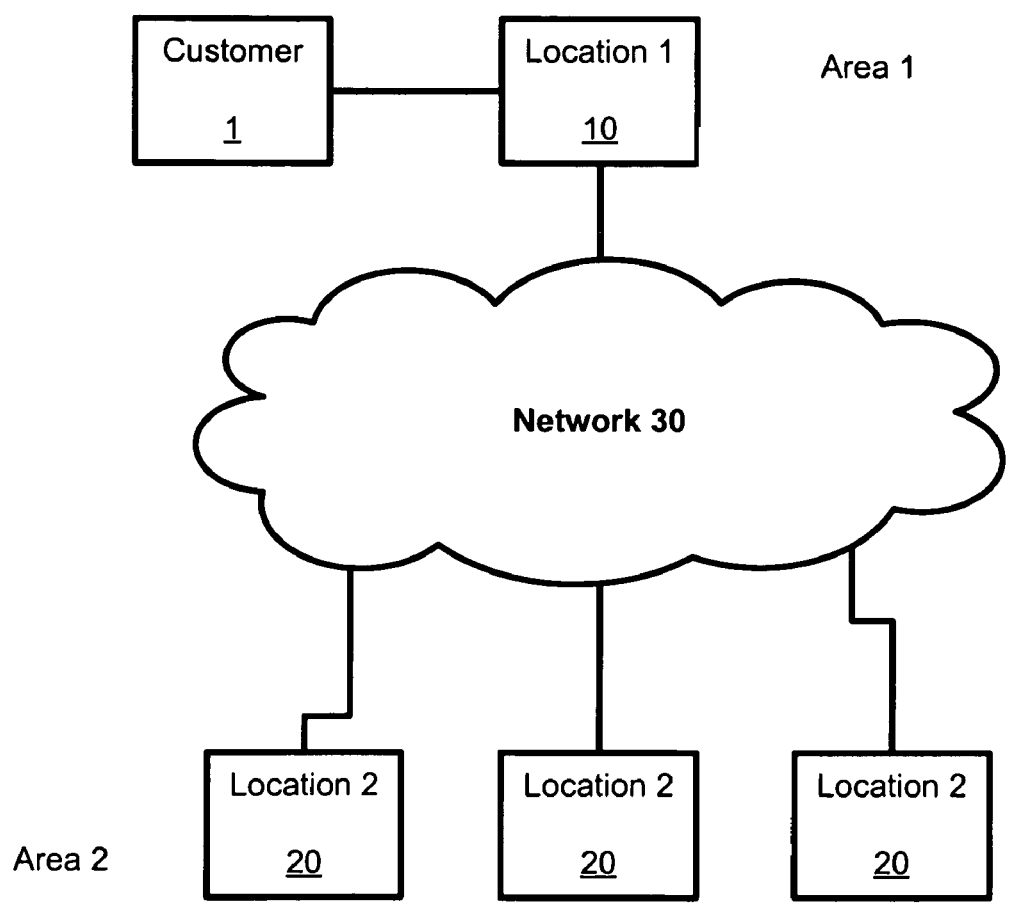
FIG. 1 is a schematic depiction of a complex project having tasks distributed between various locations.

Referring now to FIG. 1, the difficulties of organizing a complex task carried out over several locations is described. In FIG. 1, an exemplary situation is introduced where a customer 1 in Area 1 contracts with a local Location 1 10 to complete a project. The Location 1 contacts various other Locations 2 20, perhaps in area 2 such as in another country, to complete aspects of the projects. In this hypothetical, Location 1 10 forwards various task assignments and related project information to the each of the locations 2 20 over a network 30. The project information generally includes the aspects of the project requested by the customer 1.

Then, the location 1 (or some other overseeing authority) will need to monitor and record the progress of each of the locations 2 20 in completion of the assigned tasks. Where one of the locations 2 20 is lagging, location 1 10 will need to adjust the assignment, e.g., redistribute task duties, in order to enable efficient and fast completion of the task. Otherwise, the project may be unreasonably delay with one or more bottlenecks where the entire project awaits the completion of a key task. One can easily appreciate that this administration of tasks becomes increasingly difficult as the project grows in complexity. For example, while the locations 2 20 are depicted as being located in the same area 2, they may in fact be located in different countries, and thus operate under different regulatory, legal, and industry requirements.

Accordingly, embodiments of the present invention provide a compliance tool 100 for overseeing project tasks at carried out in multiple locations 10, 20. In particular, the compliance tool 100 received project detail 110, perhaps through a distributed network 101. The project detail 110 contain the information on the expressly defined tasks to performed, hereafter referred to as the contracted tasks. The project details 110, for example, may lists various tasks using a predefined categorization, along with specific details about the tasks such as the task particulars (e.g., location and industry of the client), deadlines, relative importance, etc.

Using stored organization data 120, the contracted tasks may be assigned to various locations 10, 20 as needed. For example, the organization data 120 may list the capabilities and availability at each of the locations, and each of the tasks may then by assigned using known allocation techniques according the tasks categories and particulars.

The project details 110 can be further compared to the stored regulations and standards 130 to automatically any tasks (or task requirements) that are not expressly contracted. For example, certain implied tasks may be determined using the logic rules according to the location of the client and categorization of the contracted tasks. Similarly, other implied tasks be identified by the industry and location of the client. Furthermore, still other defined tasks specific to a customer may be added according to customer records contained in the stored regulations and standards 130; for example, a customer may have particular reporting and accounting needs that are stored in the stored regulations and standards 130.

Once the implied tasks are defined and the particulars of the implied tasks are filled in using the stored regulations and standards 130, then the implied tasks can likewise be assigned to the various locations 10, 20, using the stored organization data 120, for example, according to the capabilities and availability at the locations 10, 20 using known scheduling and allocation techniques.

Figure 2:
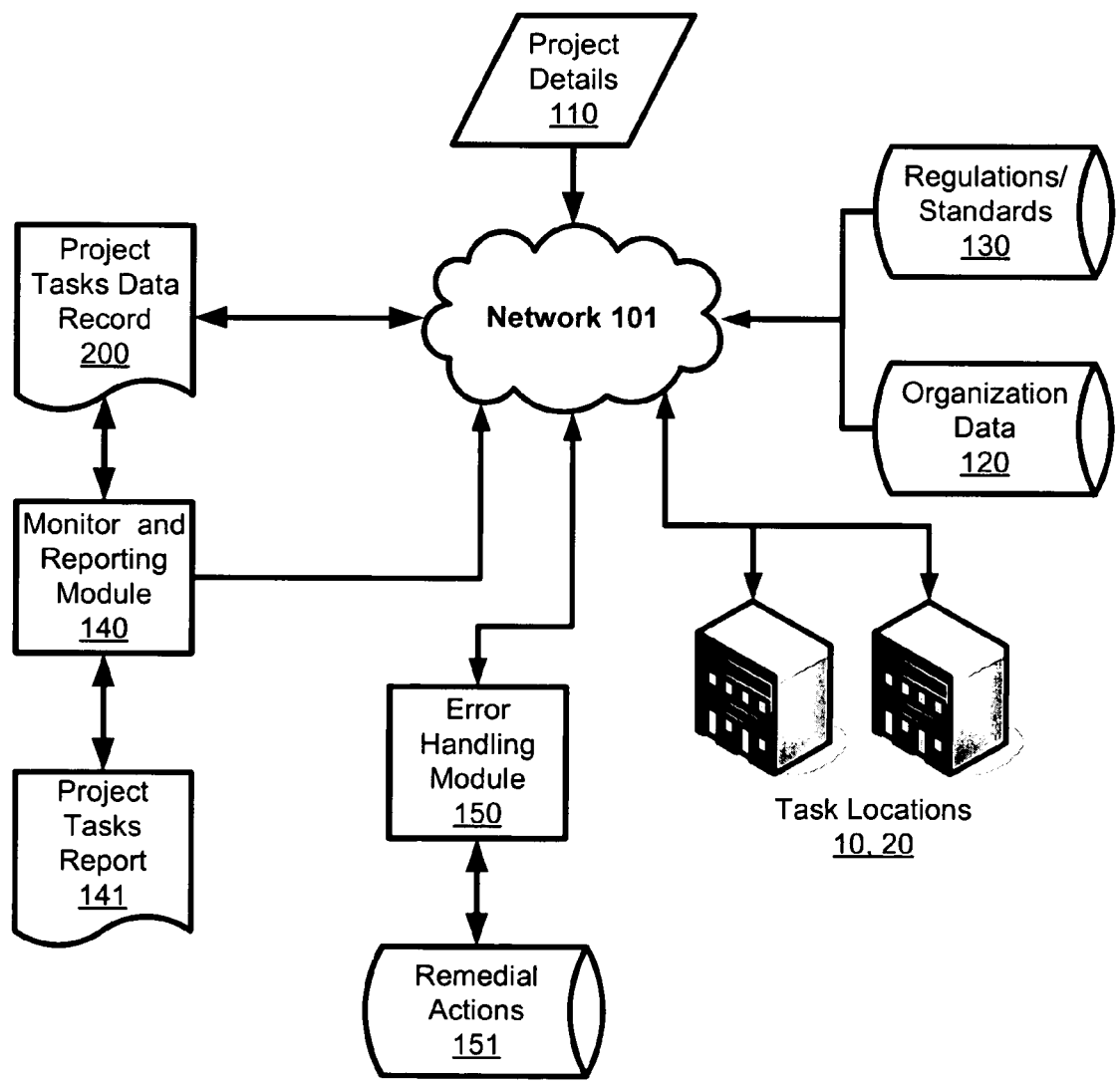
FIG. 2 is a schematic depiction of a compliance control tool in accordance with an embodiment of the present invention.

Continuing with FIG. 2, the details of the contracted and implied tasks are stored in a project task data record 200. The details of the project task data record are described in greater detail below.

Continuing with FIG. 2, a monitoring and reporting module 140 may access the project task data record 200 and may update the project task data record 200 with status reports received from the various locations 10, 20. As described in greater detail below, the monitoring and reporting module 140 may produce a project task report 141 summarizing the status of the various tasks listed in the project task data record 200.

An error handling module 150 receives results from the monitoring and reporting module 140, and may address any identified problems. Specifically, the error handling module 150 may identify any delinquent tasks and recommend or even automatically implement appropriate measures. For example, the error handling module 150 may access stored remedial actions 151 and select an appropriated course of action in response to any identified delay according to, for example, the particulars of the delayed task. In some situations, the tasks may be reprioritized in the project task data record 200. Alternatively, the organizational data 120 may indicate availability and capability at another of the locations 10, 20, so the task is reassigned. Conversely, investigation of the delay, for example, through an error code forwarded from a location 10, 20 may prompt additional tasks such as the hiring of a needed employee of acquisition of needed machinery. Thus, it can be seen that problems in completion of the task may be addresses in an automated manner through modification of the project task data record 200 using the stored organization and project data according to logic stored in the remedial actions 151.

Turning now to FIG. 3, the project task data record 200 is described in greater detail. Specifically, the project task data record 200 includes a project identifier 201 and lists the various contracted tasks 210 and implied tasks 215 assigned to the identified project. Each of the tasks records has a task name 220 that identifies the task and a task type 230 the specifies the general field of the task. Exemplary task types 400 are depicted in FIG. 5.

Continuing with the project task data record 200, each of the task may further include an assigned location 240 and stakeholder 250. The stakeholder 250 is the person actually responsible for completion of the particular task. In this way, tasks may be organized, for example by particular personnel or locations and the performance of particular personnel or locations may be specifically measured. Furthermore, this information may be used, as described above by monitoring module 140 and the error handling module 150.

The project task data record 200 further includes a deadline 260 for completion of the task. Typically, the deadline is assigned according to known scheduling techniques as needed comply with the contract terms for completion of the contract. Similarly, the project task data record 200 includes a status field 270 indicating whether a task is complete. This information is acquired from feedback from the locations 10, 20. Thus, when reviewing the status of the tasks, the monitor and reporting module may easily identify incomplete tasks that are passed the deadline.

Continuing with FIG. 3, the project task data record 200 may further include a optional weighting 280 described in greater detail below. Specifically, the task weighting 280 may be used to prioritize certain tasks. Furthermore, the task weighting 280 may be used when grading the compliance, for example, of the various locations in completing specified tasks.

The project task data record 200 may further include a summary of the particulars for the completion of the tasks 290 so that this information may be used by the error handling module 150.

Turning now to FIG. 4, a project compliance method 300 is disclosed. Using the techniques discussed above, the project details are defined in step 310. Specifically, the contracted tasks are identified in step 320 and the details of the tasks, as needed for completing the tasks, are defined in step 330. Generally, this information comes from client, for example, through the completion of an electronic form specifying the particular details of the contracted project. The details of completion of the tasks also comes from stored information about the locations (e.g., costs, availability, ability) that is used to distribute the contracted tasks.

The implied tasks are identified in step 340 and the details of the implied tasks, as needed for completing the implied tasks, are defined in step 350. Generally, this information is determined using by processing the information included with the contracted tasks, for example, by processing the electronic form from the client specifying the particular details of the contracted project. The provided information can be compared with stored regulatory and legal requirements to determine the applicable implied duties that accompany the contractual duties. The details of completion of the implied tasks also comes from stored information about the locations (e.g., costs, availability, ability) that is used to distribute the implied tasks.

Optionally, a weighting may be applied to each of the tasks in step 360, as described above. The weighing allows for prioritization of the tasks, along with a more meaningful analysis of the task completion. For example, a project may entail several key tasks and secondary tasks. Completion of only the secondary task will likely displease a customer and overall severely hamper completion of the project.

Continuing with FIG. 4, monitoring and reporting of the tasks status in step 370 may including update a project task data record with status reports received from the various locations. A project task report may summarized the status of the various tasks, and as described above, the report may identify certain tasks of concern, or even tasks assigned to certain location or personnel. Also, the report may reflect organization-wide compliance with various compliance and completion of various types of categories of tasks.

Figure 6:
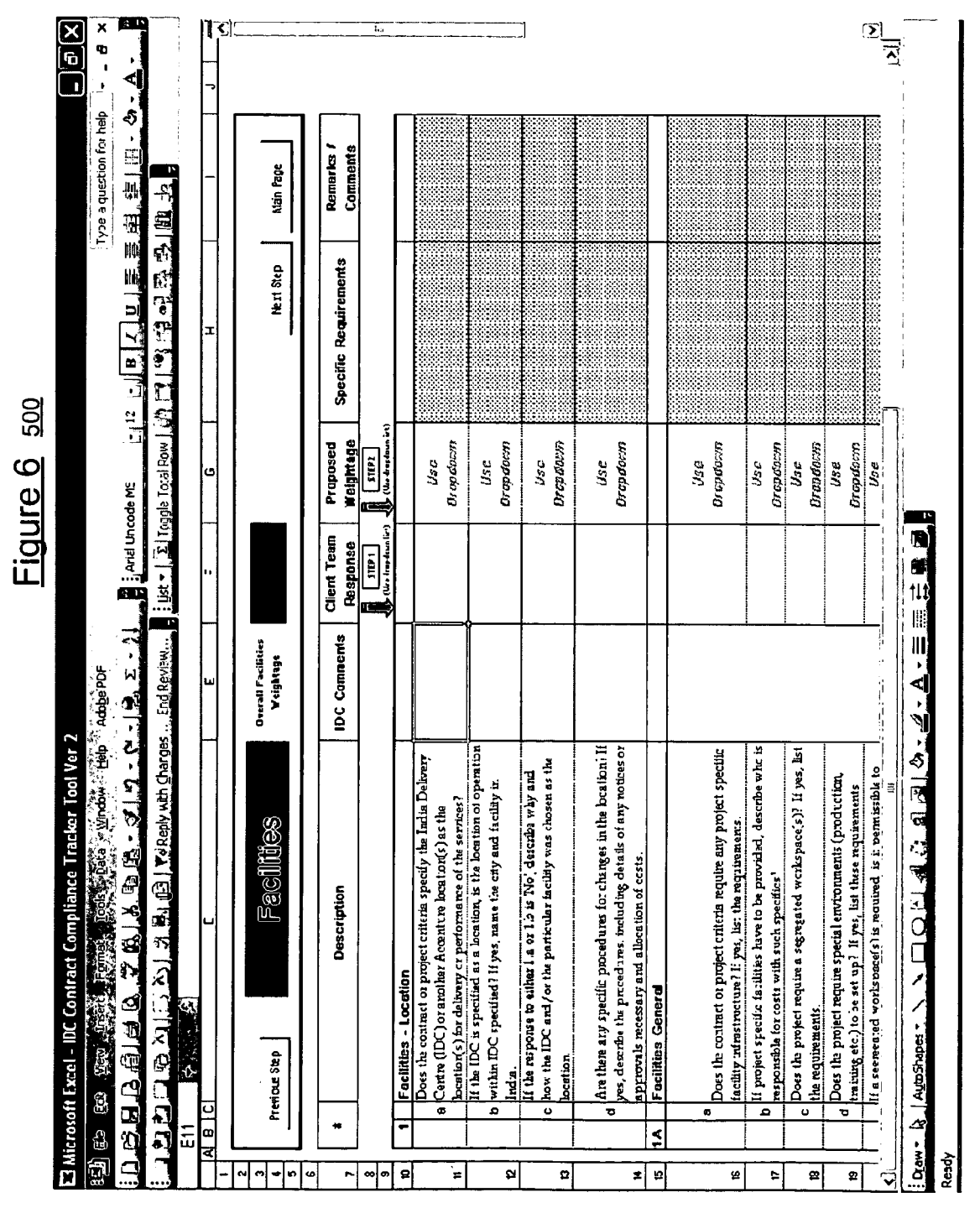

Any identified problems may optionally be addressed by appropriate measures in step 380 by identifying appropriate remedial measures. For example, a list of remedial actions may be examined and an appropriated course of action may be chosen in response to any identified delay according to, for example, the particulars of the delayed task. In some situations, the tasks may be reprioritized. Alternatively, availability and capability at another of the locations may allow the task to be reassigned. Conversely, investigation of the delay, for example, through an data provided forwarded from a remote location may prompt additional tasks such as the hiring of a needed employee of acquisition of needed machinery. Thus, it can be seen that problems in completion of the task may be addresses in an automated manner While FIG. 3 depicts the project task record 200 as organizing the tasks as being either contractual or implied, it should be appreciated that the project task record 200 may be modified and organized as needed. For example, FIG. 5 depicts exemplary task types 400, and the project task record 200 may organization tasks according task types 230. For example, FIG. 6 depicts an exemplary project task record 500 that depicts tasks associated with "Facility" management.

Figure 7:
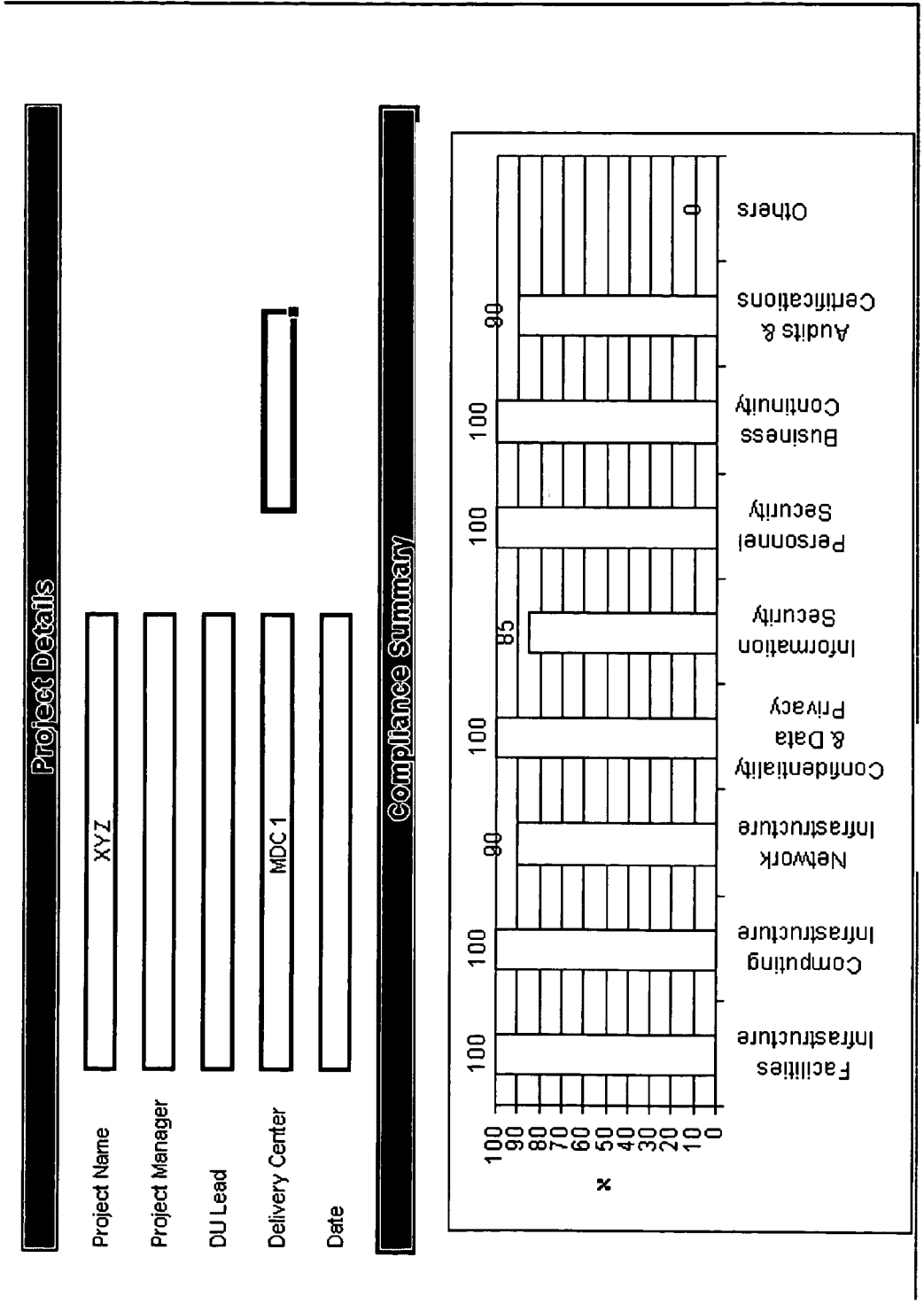
FIG. 7-8 are exemplary compliance reports produced in accordance with an embodiment of the present invention.
Figure 8:
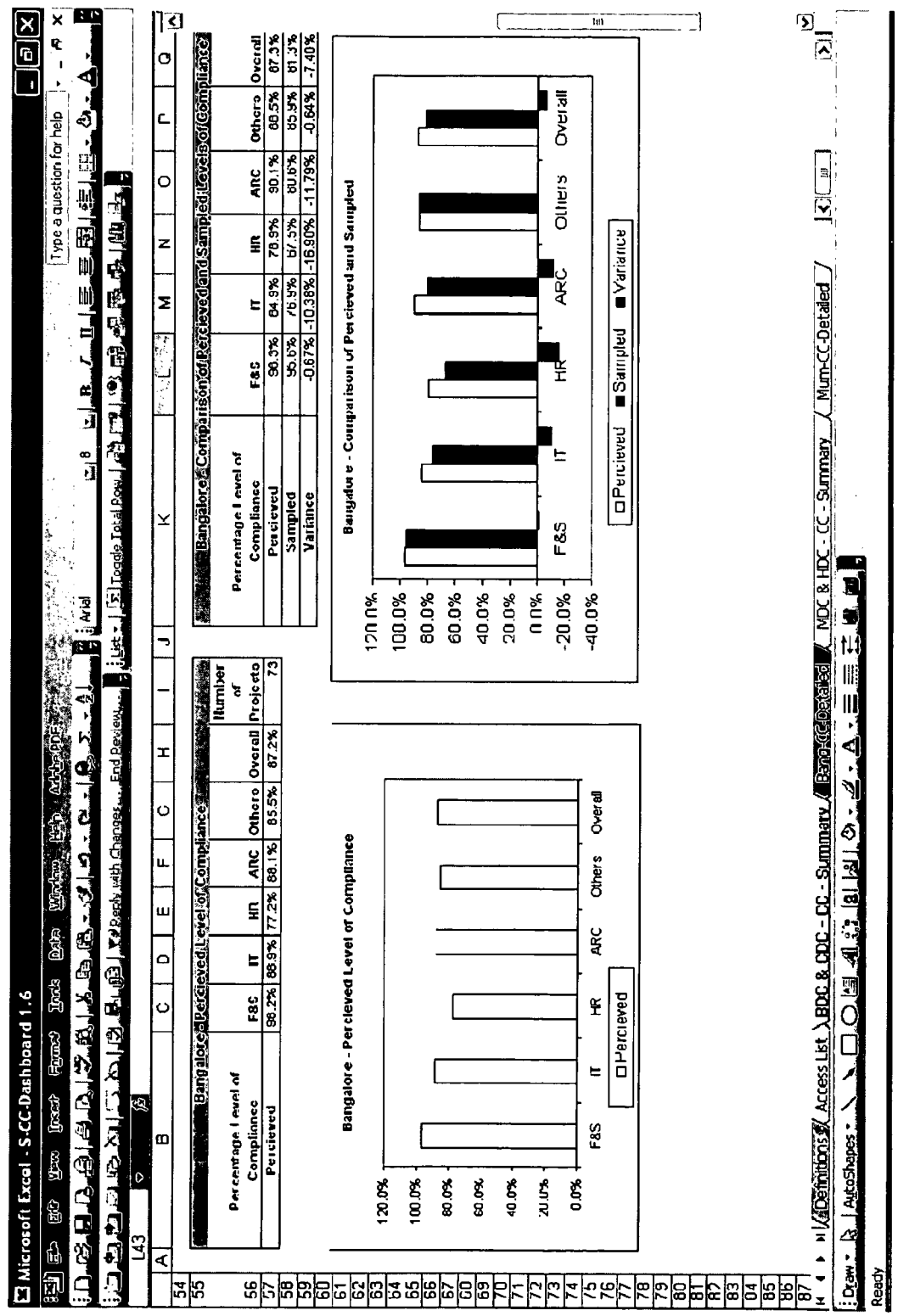

As described above, a report may summarize the performance of an organization in completing each of the tasks, both contractual and implied. In FIG. 7, an exemplary report 600 depicts compliance for task in each of the exemplary task types 400 of FIG. 5. It should be appreciated that other reports may be used as well. For example, FIG. 8 depicts an exemplary report 700 that graphically compares actual with perceived compliance of task completion in each of the exemplary task types 400 of FIG. 5. In similar way, the report may visually compare compliance between different location or at the same location over different times.

Turning now to FIG. 9, a compliance control method 800 is provided. The compliance control method is used to implement compliance control across an organization. Beginning with data capture in step 810, information about the project and the client is collected. In step 820, an organizational assessment is performed to identify key task completion aspects, i.e., define the tasks that that are generally needed to comply with the customer's needs.

Continuing with compliance control method 800, a next step is to perform survey to determine compliance attitudes in step 830. In this step, employees to surveyed to determined the perceived areas of needs and strength.

Then, an internal audit is performed in step 840 to determine actual performance with and to the status of various tasks. These results in used in step 850 to improve management of the organization by implementing changes needed to address compliance control problems, such as identifying particular task areas of need.

In this way, the compliance method 800 captures the agreed terms of customer as actionable points in the organization and country of Origin context, and then evaluates the current effectiveness of compliance at the point of delivery. Likewise, the compliance method 800 identifies the areas of improvement through control framework and provides unique weightage for prioritization to helps stakeholders to identify options for compliance while tracking.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed to incorporate new communication networks and protocols as they are developed. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A data processing system, for storing details of a plurality of tasks in a project completed at multiple locations, the data processing system comprising:
 a computer having memory and a processor;
 a task identifier field identifying each of said tasks;
 a task location field specifying each of said multiple locations for performing each of said identified tasks;
 a task weighting field specifying the relative importance of each of said identified task tasks in comparison to other of said identified tasks and grading compliance of each of said multiple locations associated with completing each of said identified tasks; and
 a status field indicating whether each of said identified tasks is completed, wherein:
 said identified tasks comprise express and implied tasks,
 said implied tasks are inferred from said express tasks, and
 said implied tasks are determined by comparing information regarding the express tasks with regulatory and legal requirements and analyzing logic rules according to each of said multiple locations.

2. The data processing system of claim 1 further comprising:
 indicating a subject of said identified tasks.

3. The data processing system of claim 1 further comprising:
 identifying a person responsible for each of said identified tasks.

4. The data processing system of claim 1 further comprising:
 identifying a time for desired completion of each of said identified tasks.

5. The data processing system of claim 1 further comprising:
 providing details related to each of said identified tasks.

6. A compliance control system, including a computer having memory and a processor, comprising:
 a unit for receiving project details;
 a unit for defining a plurality of tasks, wherein
 said tasks are performed at a plurality of locations,
 said tasks comprise express and implied tasks,
 said implied tasks are determined by comparing information regarding the express tasks with regulatory and legal requirements and analyzing logic rules according to said plurality of locations,
 said implied tasks are inferred from said express tasks and said unit for defining said tasks includes stored regulations data, standards data, and organizational data;
 a tasks storage device for storing data about said of tasks and said plurality of locations;
 a task weighting device for specifying the relative importance of each of said tasks in comparison to the other of said tasks and for grading compliance of each of said plurality of locations associated with completing each of said tasks; and
 a monitoring module for accessing said tasks storage device to update a status of said tasks.

7. The compliance control system of claim 6 further comprising:
 an error handling module to modify said tasks in response a delay in completing one of said tasks.

8. The compliance control system of claim 6 wherein the monitoring module produces a compliance report summarizing the statuses of said tasks.

9. The compliance control system of claim 8 wherein the compliance report visually summarizes the statuses of said tasks.

10. A computer-implemented compliance control method the computer including a processor and memory and the method comprising steps performed by the computer of:
 identifying, by the processor, a plurality of contracted tasks to be performed at a plurality of locations;
 defining, by the processor, details of said contracted tasks, wherein the defining includes assigning each of said plurality of locations at least one of said contracted tasks;
 identifying, by the processor, a plurality of implied tasks, wherein said implied tasks are inferred from said contracted tasks and determined by comparing information regarding the contracted tasks with regulatory and legal requirements and analyzing logic rules according to each of said plurality of locations;
 defining, by the processor, details of said implied tasks;
 receiving, by the processor, information regarding a status of each of said contracted tasks and implied tasks;
 weighting and prioritizing each of said contracted tasks and implied tasks based on a relationship between said contracted and implied tasks;
 grading compliance of each of said plurality of locations associated with performing each of said contracted and implied tasks; and
 monitoring and reporting, by the processor, the status of each of said contracted tasks and implied tasks.

11. The method of claim 10 further comprising the step of:
 identifying, by the processor, remedial tasks to address a delinquency in completion of one of said contracted and implied tasks.

12. The method of claim 10, wherein the step of monitoring and reporting the status of each of said contracted and implied tasks further comprises comparing, by the processor, completion of said contracted and implied tasks at each of said plurality of locations.

13. The method of claim 10, wherein
 each of said contracted and implied tasks is assigned one of a plurality of task fields that indicates at least one subject of said contracted and implied tasks, and
 the step of monitoring and reporting the status of each of said contracted and implied tasks further comprises comparing completion of said contracted and implied tasks in each of said task fields.

* * * * *